(12) United States Patent
Marupaduga

(10) Patent No.: US 11,146,990 B1
(45) Date of Patent: Oct. 12, 2021

(54) LOAD BALANCING IN A WIRELESS NETWORK BASED ON A LOAD OF A RELAY NODE

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 655 days.

(21) Appl. No.: 15/643,650

(22) Filed: Jul. 7, 2017

(51) Int. Cl.
| | |
|---|---|
| *H04W 28/08* | (2009.01) |
| *H04W 28/16* | (2009.01) |
| *H04W 36/22* | (2009.01) |
| *H04L 12/26* | (2006.01) |
| *H04W 28/02* | (2009.01) |
| *H04W 40/12* | (2009.01) |
| *H04W 24/02* | (2009.01) |

(52) U.S. Cl.
CPC ......... *H04W 28/08* (2013.01); *H04L 43/0876* (2013.01); *H04W 28/16* (2013.01); *H04W 36/22* (2013.01); *H04W 24/02* (2013.01); *H04W 28/02* (2013.01); *H04W 28/085* (2013.01); *H04W 40/12* (2013.01)

(58) Field of Classification Search
CPC .............................. H04W 28/16; H04W 28/08
USPC .......................................................... 370/332
See application file for complete search history.

(56) References Cited

U.S. PATENT DOCUMENTS

| | | | |
|---|---|---|---|
| 8,649,348 B2 | 2/2014 | Huang et al. | |
| 8,817,690 B2 | 8/2014 | Huang et al. | |
| 9,271,212 B1 * | 2/2016 | Hou ....................... | H04W 36/22 |
| 2013/0089073 A1 * | 4/2013 | Zhu ................... | H04W 36/0022 |
| | | | 370/331 |
| 2013/0121155 A1 * | 5/2013 | Agarwal ................ | H04W 28/24 |
| | | | 370/236 |
| 2015/0045032 A1 * | 2/2015 | Tomici ............... | H04W 28/0289 |
| | | | 455/436 |

FOREIGN PATENT DOCUMENTS

WO WO-2015018032 A1 * 2/2015 ........... H04L 45/306

* cited by examiner

*Primary Examiner* — Angel T Brockman (57) ABSTRACT

Exemplary embodiments described herein include systems, methods, and processing nodes for performing load balancing in a wireless network based on a load of a relay node communicatively coupled to a donor access node. Exemplary methods described herein include determining that a traffic load on a relay node meets a threshold, wherein the relay node is configured to relay traffic between an access node and a first one or more wireless devices attached to the relay node, and attempting to offload a second one or more wireless devices attached to the access node and located at a cell edge of the access node.

20 Claims, 7 Drawing Sheets

LOAD BALANCING IN A WIRELESS NETWORK BASED ON A LOAD OF A RELAY NODE

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed.

However, relay nodes may be limited in their ability to effectively service wireless devices that are attached to it, particularly if the donor access node is serving numerous additional wireless devices that are directly connected thereto. For example, when a load of a backhaul connection of a relay node is high, performance is degraded for wireless devices connect to either the donor access node or the relay access node. However, there is currently no optimal mechanism for allocating resources towards a relay access node based on a load of the relay access node affecting resource usage of the donor access node.

OVERVIEW

Exemplary embodiments described herein include systems, methods, and processing nodes for performing load balancing in a wireless network based on a load of a relay node communicatively coupled to a donor access node. Exemplary methods described herein include determining that a traffic load on a relay node meets a threshold, wherein the relay node is configured to relay traffic between an access node and a first one or more wireless devices attached to the relay node, and attempting to offload a second one or more wireless devices attached to the access node and located at a cell edge of the access node.

An exemplary system described herein includes a processing node, and a processor communicably coupled to the processing node, the processor for enabling the processing node to perform operations including monitoring a load of a relay node attached to an access node. The load is based on a resource requirement of wireless devices attached to the relay node. The operations further include determining that the load meets a threshold, identifying a number of wireless devices attached to the access node and adjacent a cell edge of the access node, and initiating a handover of one or more of the number of wireless devices.

An exemplary processing node described herein is configured to perform operations including obtaining a load of a relay node attached to an access node, and offloading wireless devices attached to the access node based on the load.

DETAILED DESCRIPTION

An exemplary system described herein includes at least two access nodes that are in direct communication with each other, via a wired or wireless link. For example, the first access node may be a macrocell access node, such as an eNodeB, and the second access node may be a small cell access node, such as a relay node in wireless communication with the macrocell access node, or a home eNodeB in wired communication with the macrocell access node. In embodiments described herein, the relay node is configured to relay data packets between the first access node and an end-user wireless device attached to the relay access point. The first access node may therefore be referred to as a donor access node.

Further, the donor access node (or any other network node) may be configured to perform operations for load balancing. These operations include monitoring a traffic load on the relay node, determining that the traffic load meets (or exceeds) a threshold, and attempting to offload one or more wireless devices attached to the donor access node and located at a cell edge of the donor access node. The traffic load of the relay node indicates resource requirements or resource usage of wireless devices attached to the relay node. The traffic load may be based on monitoring bearers between the relay node and the wireless devices attached thereto. The traffic load of the relay node may be obtained from the relay node itself. Alternatively or in addition, the traffic load may be based on monitoring one or more bearers between the relay node and the donor access node. The resource requirement may include a guaranteed bit rate (GBR) requirement of one or more wireless devices attached to the relay node. The type of traffic (i.e. GBR, non-GBR, best-effort, etc.) may be determined based on monitoring a QCI of the bearers between either the donor access node and relay node or relay node and wireless devices connected thereto, or based on a packet inspection, or any combination thereof.

The traffic load may be compared with a threshold in order to determine whether or not to offload wireless devices from the donor access node. In some embodiments, a variance of the traffic load from the threshold may be used to determine how many wireless devices to offload. In other embodiments, a variance of GBR traffic from the threshold may be used to determine how many wireless devices to offload. The variance may be a difference between the traffic load (or GBR traffic) and the threshold. For example, upon determining that the variance is high, handover is attempted for an increased number of cell-edge wireless devices. Upon determining that a variance is low, handover is attempted for a smaller or reduced number of cell-edge wireless devices. In some embodiments, a percentage of GBR traffic relative to non-GBR (i.e. best-effort) traffic may be identified in order to determine how many wireless devices to offload from the donor access node.

In either case, the offloading comprises identifying one or more wireless devices adjacent the cell edge of the donor access node (hereinafter, "cell-edge wireless devices"), and attempting or initiating a handover of the cell-edge wireless devices to one or more neighboring access nodes. This may include determining that the cell-edge wireless devices are within range of the one or more neighboring access nodes. In some embodiments, the attempt to offload the cell-edge wireless devices may fail. For example, it may be determined that there are no cell-edge wireless devices within range of a neighboring access node. Alternatively or in addition, it may be determined that there are no wireless devices near a cell edge of the donor access node. In either case, upon determining that offloading any cell-edge wireless devices is not possible, the relay node may be instructed to offload one or more wireless devices connected thereto. For example, the relay node may be instructed to offload wireless devices having a GBR requirement, since these wireless devices would not function satisfactorily at a lower bit-rate or throughput.

In addition to the systems described herein, these operations may further be implemented as computer-readable instructions or methods, and processing nodes on the network for executing the instructions or methods. For example, a processing node coupled to a donor access node or a relay node may be configured to perform the methods described herein. These and other embodiments are further described herein and with reference to FIGS. 1-7.

Figure 1:
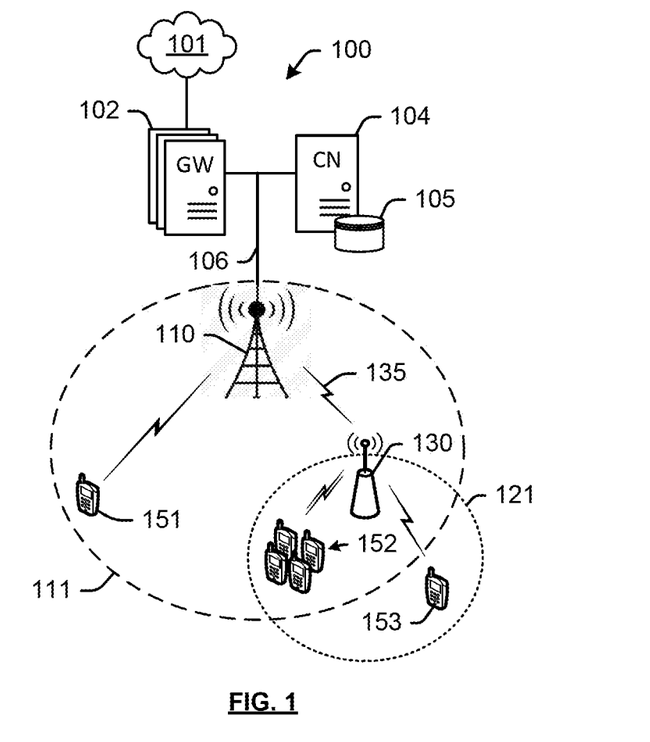
FIG. 1 depicts an exemplary system for performing load balancing in a wireless network.

FIG. 1 depicts an exemplary system 100 for performing load balancing based on a traffic load of a relay node. System 100 comprises a communication network 101, gateway 102, controller node 104, access node 110, relay node 130, and end-user wireless devices 151, 152, and 153. Access node 110 can be any network node configured to deploy a wireless air interface to which wireless devices 151, 152 and relay node 130 can attach, thereby gaining access to network services provided by network 101. Access node 110 can be a standard macrocell access node, such as a base transceiver station, a radio base station, an eNodeB device, or an enhanced eNodeB device. In an exemplary embodiment, a macrocell access node can have a coverage area 111 in the range of approximately 5 km-35 km and an output power in the tens of watts. In this embodiment, access node 110 is configured to provide network access to first wireless device 151 that is within coverage area 111 and attached directly to access node 110 over a wireless air interface deployed by access node 110. Wireless device 151 is illustrated as being near an edge of coverage area 111 (i.e. "cell edge"). In exemplary embodiments, a cell-edge wireless device is any wireless device located within a range of distances from the edge of a coverage area of an access node. For example, the range may be +/−5 km from the edge of coverage area 111. Additionally, wireless devices 152 are located near the cell edge of coverage area 111, and wireless device 153 is located outside a cell edge of coverage area 111. Thus, each of these wireless devices 152, 153 may benefit from attaching to relay node 130, which is configured to relay network services from access node 110 to wireless devices 152, 153, and data packets therebetween. Consequently, access node 110 may be termed a "donor" access node.

To enable relaying, donor access node 110 can be further configured to deploy radio bearer 135 (hereinafter referred to as a wireless backhaul link) to which relay node 130 can attach. As further described herein and with respect to FIGS. 3-4, relay node 130 may comprise a customer premise equipment (CPE), which can be any stationary LTE wireless device having a stronger computational & RF capability versus standard wireless devices, as well as a directional antenna and a dedicated power supply, and an access point (AP) to which wireless devices 152, 153 can attach. For example, relay node 130 can further comprise any short range, low power, small-cell access nodes such as a microcell access node, a picocell access node, a femtocell access node, or a home eNodeB device. Relay node 130 can be configured to deploy another wireless air interface having coverage area 121. As a consequence, wireless devices 152, despite being within coverage area 111, may access network services using the combination of relay node 130 and wireless backhaul link 135, rather than directly connecting to (and potentially overloading) donor access node 110. Moreover, wireless device 153 that is outside coverage area 111 may access network services from donor access node 110 by virtue of being connected to relay node 130. Although only donor access node 110, relay node 130, and wireless devices 151-153 are shown in system 100, any other combination of access nodes, relay nodes, and wireless devices may be evident to those having ordinary skill in the art in light of this disclosure.

In operation, system 100 may be configured to perform load balancing operations including determining that a traffic load of relay node 130 meets (or exceeds) a threshold, and attempting to offload one or more wireless devices attached to donor access node 110 and located at a cell edge of donor access node 110, such as wireless device 151. The traffic load of relay node 130 indicates resource requirements or resource usage of wireless devices 152, 153 attached to relay node 130. The traffic load may be based on monitoring bearers between relay node 130 and wireless devices 152, 153 attached thereto. The traffic load of the relay node may be obtained from relay node itself 130. Alternatively or in addition, the traffic load may be based on monitoring one or more bearers on wireless backhaul link 135. Further, the resource requirement may include a guaranteed bit rate (GBR) requirement of one or more of wireless devices 152, 153, and the type of traffic (i.e. GBR, non-GBR, best-effort, etc.) may be determined based on monitoring a QCI, packet inspection, or any combination thereof.

As further described herein, the traffic load of relay node 130 may be compared with a threshold in order to determine whether or not to offload wireless device 151 from donor access node 110. In some embodiments, a variance of the traffic load from the threshold may be used to determine how many wireless devices to offload. In other embodiments, a variance of GBR traffic (of wireless devices 152, 153) from the threshold may be used to determine how many wireless devices to offload. The variance may be a difference between the traffic load (or GBR traffic) and the threshold. For example, upon determining that the variance is high, handover is attempted for an increased number of cell-edge wireless devices such as wireless device 151. Upon determining that a variance is low, handover is attempted for a smaller or reduced number of cell-edge wireless devices. In some embodiments, a percentage of GBR traffic relative to non-GBR (i.e. best-effort) traffic of wireless devices 152, 153 may be identified in order to determine how many wireless devices to offload from the donor access node.

In either case, the offloading comprises identifying wireless device 151 adjacent the cell edge of coverage area 111 and attempting or initiating a handover to one or more neighboring access nodes (not shown herein but further described with reference to system 600 in FIG. 6). This may include determining that cell-edge wireless device 151 is within a range of one or more neighboring access nodes. In some embodiments, the attempt to offload cell-edge wireless device 151 may fail. For example, it may be determined that wireless device 151 is not within range of a neighboring access node. Alternatively or in addition, it may be determined that wireless device 151 is not within the range defining a cell edge. In other words, wireless device 151 may not be located within a cell edge region of coverage area 111. In either case, upon determining that offloading any cell-edge wireless devices is not possible, relay node 130 may be instructed to offload one or more wireless devices connected thereto, such as wireless devices 152, 153. For example, relay node 130 may be instructed to offload wireless devices having a GBR requirement, since these wireless devices would not function satisfactorily at a lower bit-rate or throughput.

Access node 110 and relay node 130 can comprise a processor and associated circuitry to execute or direct the execution of computer-readable instructions to perform operations such as those further described herein. Briefly, access node 110 and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 130 can receive instructions and other input at a user interface. Access node 110 communicates with gateway node 102 and controller node 104 via communication links 106, 107. Access node 110 and relay node 130 may communicate with each other, and other access nodes (not shown), using a wireless link or a wired link such as an X2 link. Components of exemplary access nodes 110 and relay nodes 130 are further described with reference to FIGS. 2-4.

Wireless devices 151-153 may be any device, system, combination of devices, or other such communication platform capable of communicating wirelessly with access node 110 and/or relay node 130 using one or more frequency bands deployed therefrom. Each of wireless devices 151-153 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 151-153. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path~including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format~including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as presence and location of access node 110, relay node 130, and neighboring access nodes, device capabilities and locations of wireless devices such as wireless device 151, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
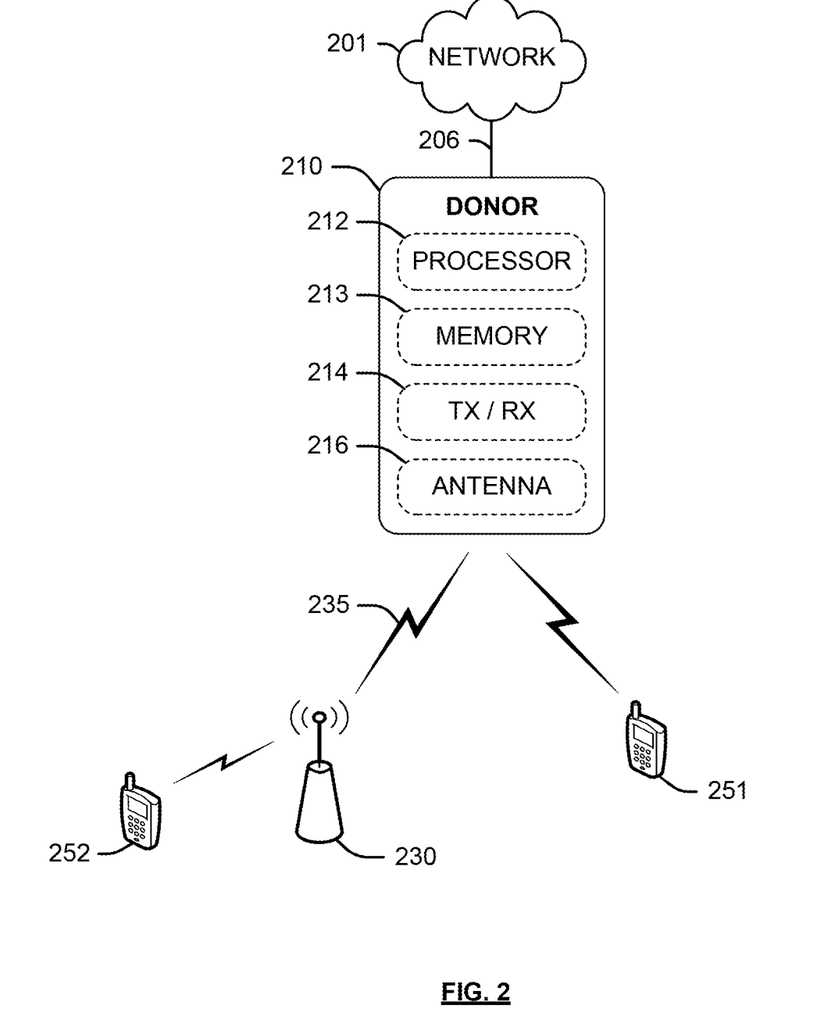
FIG. 2 depicts an exemplary access node.

FIG. 2 depicts an exemplary access node 210. Access node 210 may comprise, for example, a macro-cell access node, such as donor access node 110 described with reference to FIG. 1. Access node 210 is illustrated as comprising a processor 212, memory 213, transceiver 214, and antenna 216. Processor 212 executes instructions stored on memory 213, while transceiver 214 and antenna 216 enable wireless communication with relay node 230 and wireless device 251. Instructions stored on memory 213 may include determining that a traffic load of relay node 230 meets (or exceeds) a threshold, and attempting to offload one or more wireless devices attached to access node 210, such as wireless device 251. The traffic load of relay node 230 indicates resource requirements or resource usage of wireless device 252 attached thereto, and may be obtained by monitoring bearers on wireless backhaul link 235, or reported from relay node 230. The traffic load may be compared with a threshold in order to determine whether or not to offload wireless device 251 from donor access node 210 to a neighboring access node. To enable this, wireless device 251 may be identified as being adjacent a cell edge of a coverage area of access node 210, and within range of the one or more neighboring access nodes. If wireless device 251 is identified as not being within a cell-edge region or within a coverage area of a neighboring access node, then access node 210 may instruct relay node 230 to offload one or more wireless devices connected thereto, such as wireless device 252. For example, relay node 230 may be instructed to offload wireless device 252 if wireless device 252 has a GBR requirement.

Figure 3:
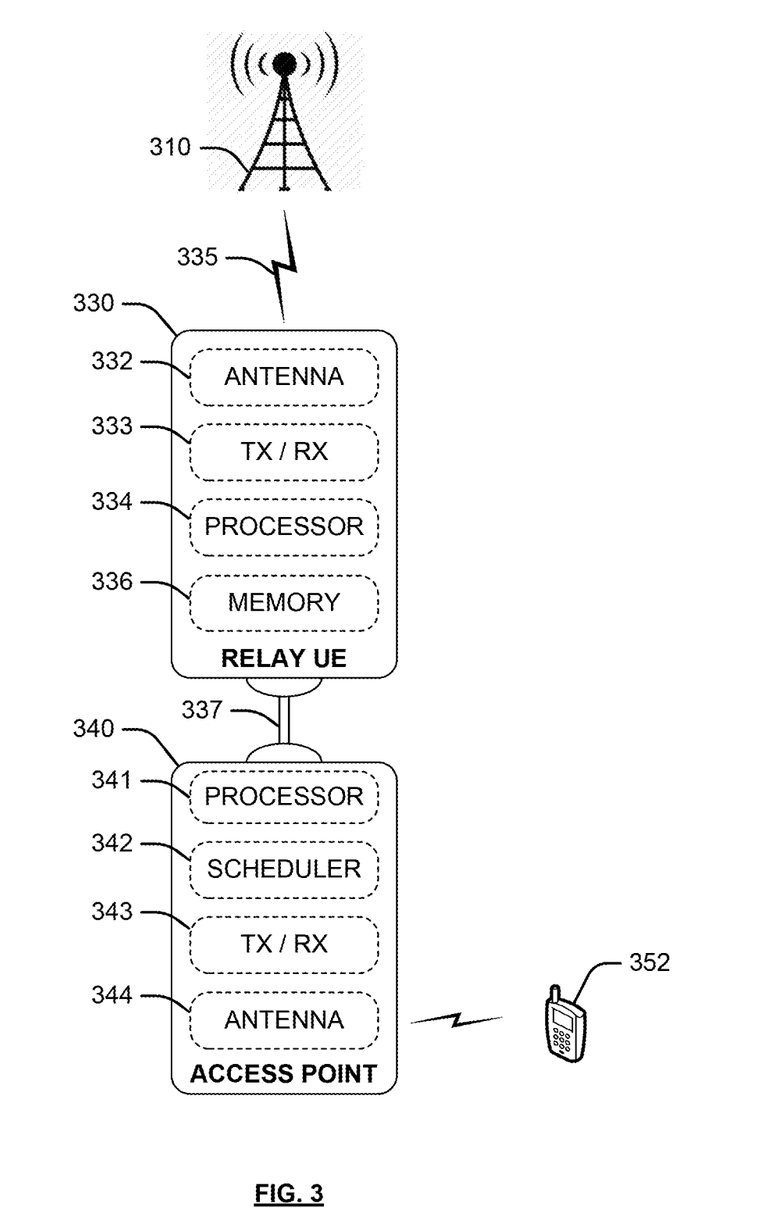
FIG. 3 depicts an exemplary relay node comprising a relay wireless device and a relay access point.

FIG. 3 depicts an exemplary relay node comprising a relay wireless device 330 and a relay access point (AP) 340. Relay wireless device 330 is illustrated as comprising an antenna 332 for direct (i.e. unrelayed) communication with donor access node 310 via wireless backhaul link 335, a transceiver 333, a processor 334, and a memory 336 for storing instructions that enable relay wireless device 330 to perform operations described herein. In some embodiments, relay wireless device 330 is referred to as a customer premise equipment (CPE), which includes any stationary LTE wireless device having a stronger computational & RF capability versus standard wireless devices, as well as a directional antenna and a dedicated power supply, enabling relay wireless device 330 to efficiently provide resources to wireless device 352 via relay access point 340. Relay access point 340 is illustrated as comprising an antenna 341 and transceiver 342 for enabling communication with wireless device 360, processor 343, and a memory 344 for storing instructions that are executed by processor 343. In some embodiments, relay access point 340 may be a home eNodeB. Relay access point 340 can be co-located with relay wireless device 330, and is connected to relay wireless device 330 via a communication interface 337. Communication interface 337 may be any interface that enables direct communication between relay wireless device 330 and relay access point 340, such as USB, FireWire, Ethernet, or any other serial, parallel, analog, or digital interface. Moreover, although only one transceiver is depicted in each of relay wireless device 330 and relay access point 340, additional transceivers may be incorporated in order to facilitate communication across interface 337 and other network elements.

In operation, relay wireless device 330 may be configured to relay network services from donor access node 310 to wireless device 352 via relay access point 340. Relay wireless device 330 may begin to function as a relay wireless device by sending a message to donor access node 310 to indicate to donor access node 310 that wireless device 330 is functioning as a relay wireless device. In some embodiments, relay wireless device 330 can request to send a buffer status report to donor access node 310. Donor access node 310 can grant this request in a conventional manner. Relay wireless device 330 may respond to the grant by sending a short buffer status report. This short buffer status report is associated with a logical channel group that indicates the buffer status report is communicating the status of relay wireless device 330 as a relay, and thus is not asking for additional resource allocations (like a 'conventional' buffer status report would indicate). In other words, when relay wireless device 330 responds with a buffer status report for the 'special' logical channel group, it means that the buffer status report is not actually reporting the status of a buffer. Rather, this buffer status report indicates that the wireless device is now functioning as a relay. Once status of relay wireless device 330 is established, relay wireless device 330 may instruct relay access point 340 to start accepting connection requests from one or more wireless devices such as wireless device 352.

Further, based on the indication of relay status, donor access node 310 may alter how relay wireless device 330 is treated. For example, relay wireless device 330 may be provided with preferential treatment because it is functioning as a relay. In an exemplary embodiment, a specific class indicator is assigned to wireless backhaul link 335 between relay wireless device 330 and donor access node 310. The class indicator may be a QCI that is different from other QCIs assigned to wireless devices that are directly connected to donor access node 310. In other embodiments, upon determining that a resource requirement of wireless device 352 meets a threshold or other criteria, access node 310 may be instructed to offload cell-edge wireless devices connected thereto, or to instruct relay access point 340 to offload wireless device 352, particularly if wireless device 352 has a GBR requirement.

Figure 4:
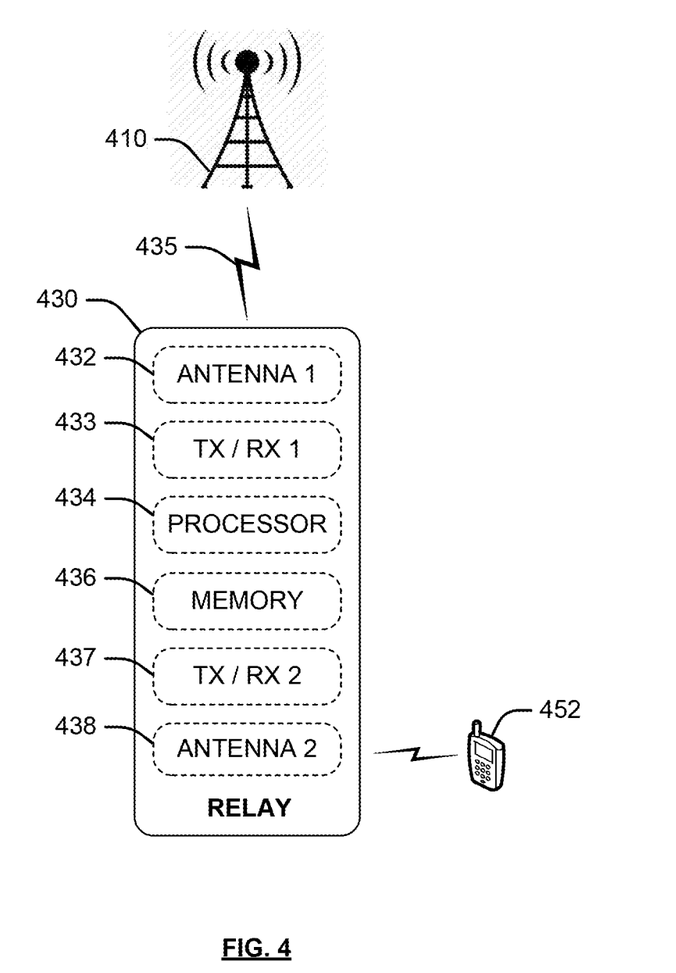
FIG. 4 depicts another exemplary relay node.

In another exemplary embodiment, a relay node may integrate components of both relay wireless device and a relay access point into a single unit. FIG. 4 depicts an exemplary relay node 430 of this type. Relay node 430 is illustrated as comprising an antenna 432 for direct (i.e. unrelayed) communication with donor access node 410 via a wireless backhaul link 435, a transceiver 433, a processor 434, and a memory 436 for storing instructions that are executed by processor 434 as described herein. Relay node 430 further includes another transceiver 437 and antenna 438 for enabling communication with wireless device 452. Relay node 430 can perform operations similar to those described with respect to FIG. 3.

In an embodiment, the relay nodes depicted in FIG. 3-4 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 5:
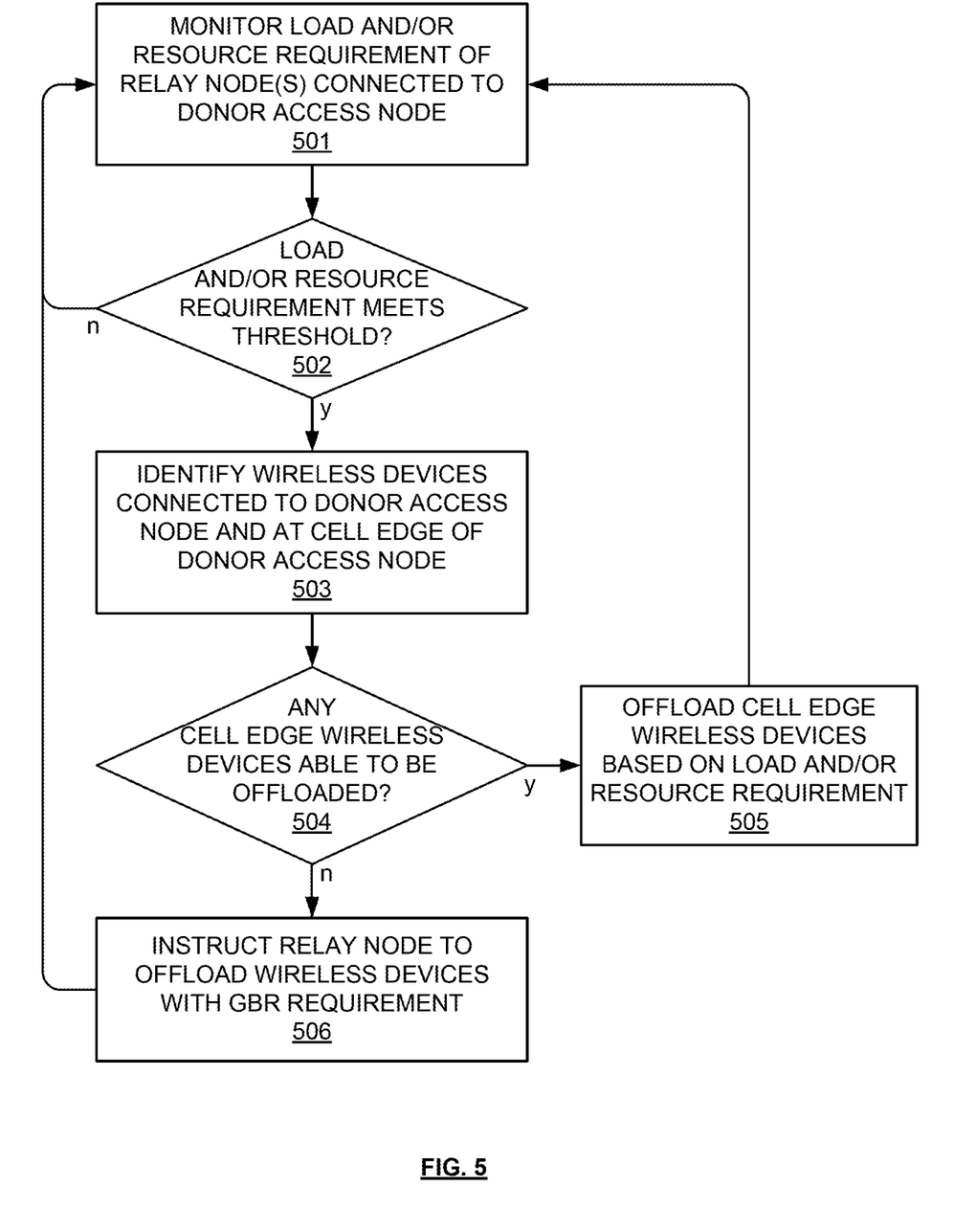
FIG. 5 depicts an exemplary method for load balancing in a wireless network.

FIG. 5 depicts an exemplary method for performing load balancing in a wireless network based on a load of a relay node connected to a donor access node. The method of FIG. 5 may be implemented by an access node (such as donor access node 110), by a relay node (such as relay node 130, 330), by a controller node (such as controller node 104), or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 501, a load and/or resource requirement is monitored of a relay node communicably coupled to a donor access node. For example, the donor access node may comprise a macrocell access node, such as an eNodeB, and the relay node may comprise a small cell access node configured to relay data packets between the donor access node and an end-user wireless device attached to the relay node. The load of the relay node indicates resource requirements or resource usage of these end-user wireless devices attached to the relay node. The load may be based on monitoring bearers between the relay node and the wireless devices attached thereto. The load of the relay node may be obtained from the relay node itself. Alternatively or in addition, the load may be based on monitoring one or more bearers between the relay node and the donor access node. The resource requirement may include a guaranteed bit rate (GBR) requirement of one or more wireless devices attached to the relay node. The type of traffic (i.e. GBR, non-GBR, best-effort, etc.) may be determined based on monitoring a QCI of the bearers between either the donor access node and relay node or relay node and wireless devices connected thereto, or based on a packet inspection, or any combination thereof. In an exemplary embodiment, the load comprises an aggregate of existing traffic on the relay node and a GBR requirement of any wireless devices connected thereto.

At 502, the load may be compared with a threshold in order to determine whether or not to offload wireless devices from the donor access node. The threshold may be defined based on a network operator's needs, and may be dynamically adjusted based on a total load on the donor access node. In some embodiments, a variance of the traffic load from the threshold may be determined. For example, a variance of GBR traffic from the threshold may be used to determine how many wireless devices to offload. The variance may be a difference between the traffic load (or GBR traffic) and the threshold. In some embodiments, a percentage of GBR traffic relative to non-GBR (i.e. best-effort) traffic may be determined in order to determine how many wireless devices to offload from the donor access node. If the load does not meet or exceed the threshold, then the method returns to monitoring 501. However, if the load meets or exceeds the threshold, the method continues.

At 503, one or more wireless devices adjacent the cell edge of the donor access node (hereinafter, "cell-edge wireless devices") are identified. The cell-edge wireless devices may be identified based on a known location of the wireless devices that is determined based on, for instance, an uplink sounding reference signal (SRS). Identifying cell-edge wireless devices may also include determining that the cell-edge wireless devices are within range of the one or more neighboring access nodes. This may be determined based on signal measurements performed at the cell-edge wireless devices and reported back to the donor access node. For example, upon determining (at 502) that the load of one or more relay access nodes meets a threshold, the donor access node can instruct wireless devices attached thereto to perform signal level measurements to enable identification 503.

At 504, a decision is made as to whether or not cell-edge wireless devices may be offloaded. If such cell-edge wireless devices exist then, at 505, the cell-edge wireless devices are offloaded. For example, handover proceedings may be initiated for such devices. A number of cell-edge wireless devices may be offloaded based on the load and/or resource requirement obtained at 501-502. For example, a variance of GBR traffic from the threshold may be used to determine how many cell-edge wireless devices to offload. The variance may be a difference between the traffic load (or GBR traffic) and the threshold. For example, upon determining that the variance is high, handover is attempted for an increased number of cell-edge wireless devices. Upon determining that a variance is low, handover is attempted for a smaller or reduced number of cell-edge wireless devices. In some embodiments, a percentage of GBR traffic relative to non-GBR (i.e. best-effort) traffic may be identified in order to determine how many cell-edge wireless devices to offload from the donor access node.

If it is determined at 504 that there are no cell-edge wireless devices within range of a neighboring access node, or that there are no wireless devices near a cell edge of the donor access node, then the method continues to 506, wherein the relay node is instructed to offload one or more wireless devices connected thereto. For example, the relay node may be instructed to offload wireless devices having a GBR requirement, since these wireless devices would not function satisfactorily at a lower bit-rate or throughput. Subsequently, the method loops back to 501 to continue monitoring the load on the relay node(s) and to repeat these operations as necessary for load balancing.

Figure 6A:
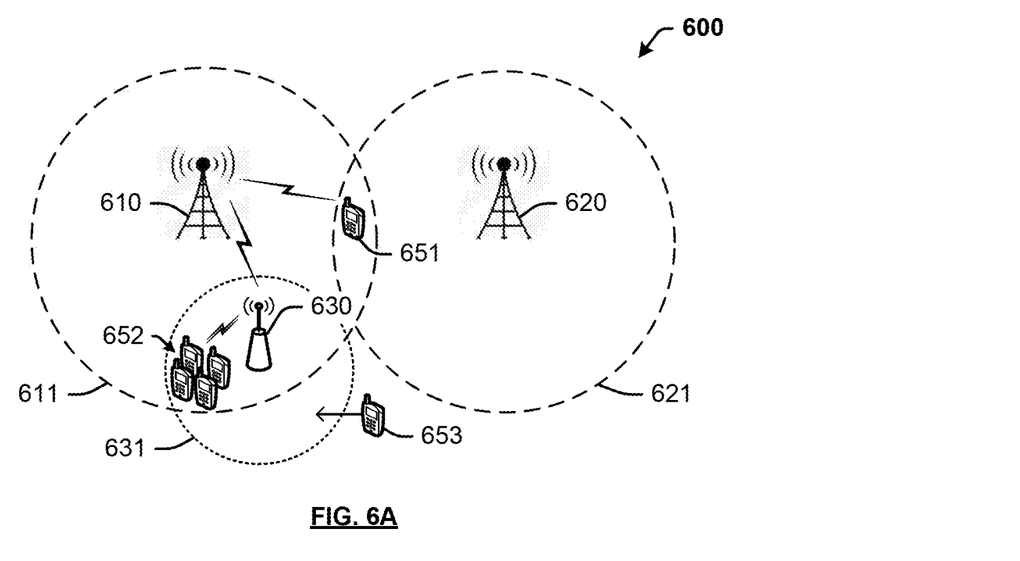
FIGS. 6A-6B depict offloading wireless devices based on a load of a relay node in a wireless network.
Figure 6B:
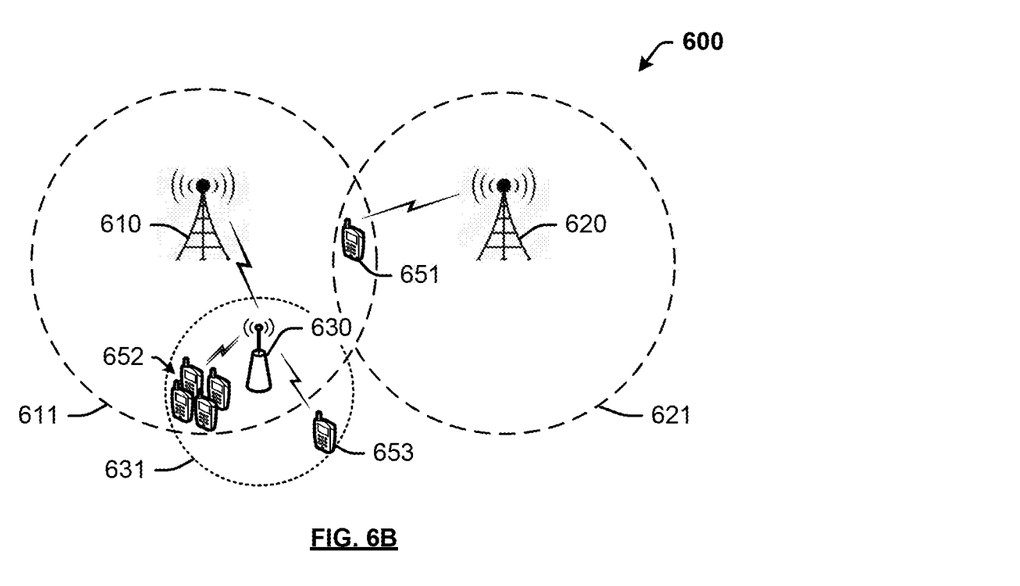

FIGS. 6A-6B depict an exemplary system 600 for performing load balancing based on the method described above. System 600 comprises donor access node 610, neighboring access node 620, relay node 630, and end-user wireless devices 651, 652, 653. Access node 610 may be considered equivalent to access node 110 in system 100, relay node 630 may be considered equivalent to relay node 130, and wireless devices 651-653 may be considered equivalent to wireless devices 151-153. Other network elements may be present to facilitate communication but are omitted for clarity, such as controllers, gateways, and physical and/or wireless data links for carrying data among the various network elements.

With reference to FIG. 6A, wireless device 651 is illustrated as being near an edge of coverage area 611 (i.e. "cell edge"), and within range of coverage area 621 of neighboring access node 620. Consequently wireless device 651 may be identified as a cell-edge wireless device, based on the operations described herein. Additionally, wireless devices 652 are located near the cell edge of coverage area 611 and within coverage area 631 of relay node 630, thereby attaching to relay node 630 rather than directly connecting to (and potentially overloading) donor access node 610. Moreover, wireless device 653 is illustrated as being outside both coverage areas 611 and 653, but moving towards coverage area 653.

Subsequently, with respect to FIG. 6B, wireless device 653 is illustrated as being within coverage area 653 and attaching to relay node 630. Thus, system 600 is configured to determine that a traffic load of relay node 630 now meets (or exceeds) a threshold, and attempts to offload cell-edge wireless device 651 to neighboring access node 620. For example, the traffic load of relay node 630 may be increased based on the additional resource requirements (or resource usage) of wireless device 653 in addition to wireless devices 652. The traffic load may be increased to beyond a threshold, such that a handover of wireless device 651 to neighboring access node 620 is triggered.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, relay node 120, controller node 104, and/or network 101.

Figure 7:
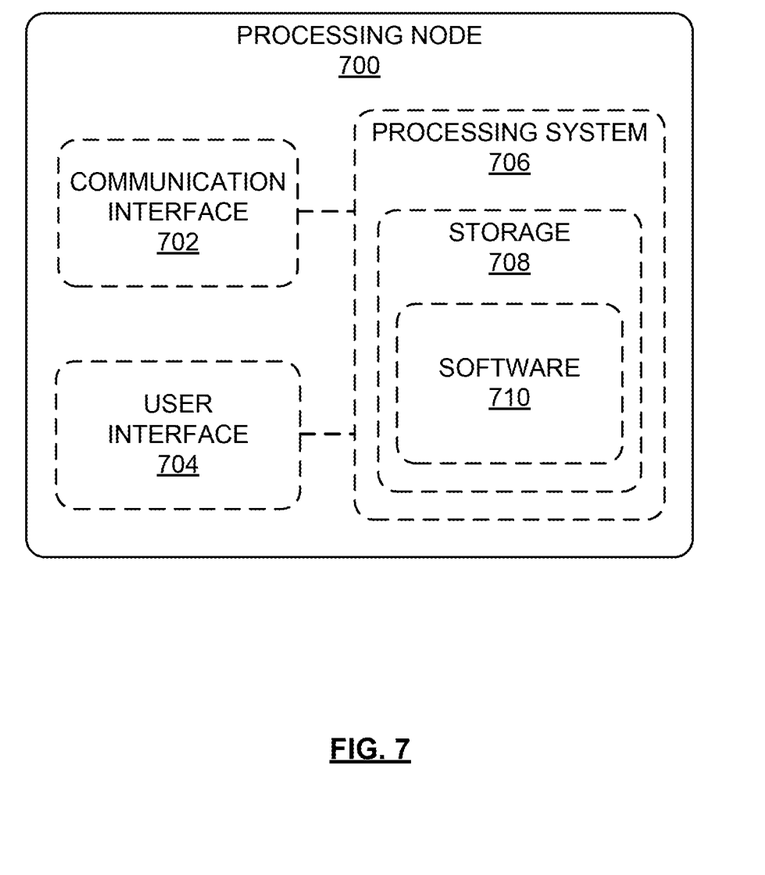
FIG. 7 depicts an exemplary processing node for performing load balancing in a wireless network.

FIG. 7 depicts an exemplary processing node for performing load balancing based on relay node load levels. Processing node 700 comprises a communication interface 702, user interface 704, and processing system 706 in communication with communication interface 702 and user interface 704.

Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a module for performing transmission power control operations described herein. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing load balancing in a wireless network, the method comprising:
   determining that a traffic load on a relay node meets a threshold, wherein the relay node is configured to relay traffic between an access node and a first one or more wireless devices attached to the relay node; and
   attempting to offload a second one or more wireless devices attached to the access node and located at a cell edge of the access node.

2. The method of claim 1, further comprising obtaining the traffic load from the relay node.

3. The method of claim 2, wherein the traffic load comprises a resource requirement of each of the first one or more wireless devices.

4. The method of claim 3, wherein the resource requirement is based on a guaranteed bit rate (GBR) requirement of at least one of the one or more wireless devices.

5. The method of claim 1, further comprising determining the traffic load based on one or more bearers between the access node and the relay node.

6. The method of claim 1, further comprising comparing the traffic load with the threshold.

7. The method of claim 1, wherein the attempting to offload comprises initiating a handover of the second one or more wireless devices to one or more neighboring access nodes.

8. The method of claim 7, further comprising determining that the second one or more wireless devices are within range of the one or more neighboring access nodes.

9. The method of claim 1, further comprising:
   determining that the attempting to offload the second one or more wireless devices failed; and
   instructing the relay node to offload at least one of the first one or more wireless devices.

10. The method of claim 9, wherein the at least one of the first one or more wireless devices has a requirement for a guaranteed bit rate (GBR).

11. A system for performing load balancing in a wireless network, the system comprising:
    a processing node; and
    a processor communicably coupled to the processing node, the processor for enabling the processing node to perform operations comprising:
       monitoring a load of a relay node attached to an access node, wherein the load is based on a resource requirement of wireless devices attached to the relay node;
       determining that the load meets a threshold;
       identifying a number of wireless devices attached to the access node and adjacent a cell edge of the access node; and
       initiating a handover of one or more of the number of wireless devices.

12. The system of claim 11, wherein the resource requirement comprises a guaranteed bit rate (GBR) requirement of the wireless devices attached to the relay node.

13. The system of claim 12, wherein the operations further comprise:
    determining a variance of the GBR requirement from the threshold; and
    initiating the handover of the one or more wireless devices based on the variance.

14. The system of claim 13, wherein the operations further comprise:
    determining that the variance is high; and
    initiating the handover of an increased number of wireless devices.

15. The system of claim 13, wherein the operations further comprise:
    determining that the variance is low; and
    initiating the handover of a reduced number of wireless devices.

16. A processing node for performing load balancing in a wireless network, the processing node comprising a processor and a memory, wherein the processor is configured to perform operations comprising:
    obtaining a load of a relay node attached to an access node; and
    offloading wireless devices attached to the access node based on the load.

17. The processing node of claim 16, wherein the operations further comprise identifying the wireless devices to be offloaded based on the wireless devices being located at a cell edge of the access node.

18. The processing node of claim 17, wherein the operations further comprise determining that none of the wireless devices attached to the access node are located at the cell edge.

19. The processing node of claim 18, wherein the operations further comprise identifying one or more wireless devices attached to the relay node and requesting a guaranteed bit rate.

20. The processing node of claim 19, further comprising offloading the one or more wireless devices attached to the relay node.

* * * * *